(12) United States Patent
Hirata et al.

(10) Patent No.: US 12,224,963 B2
(45) Date of Patent: Feb. 11, 2025

(54) COMMUNICATION CONTROL DEVICE AND METHOD, WIRELESS COMMUNICATION DEVICE AND METHOD, AND WIRELESS COMMUNICATION TERMINAL

(71) Applicant: SONY GROUP CORPORATION, Tokyo (JP)

(72) Inventors: Ryuichi Hirata, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 328 days.

(21) Appl. No.: 17/624,057

(22) PCT Filed: Jun. 26, 2020

(86) PCT No.: PCT/JP2020/025166
§ 371 (c)(1),
(2) Date: Dec. 30, 2021

(87) PCT Pub. No.: WO2021/010132
PCT Pub. Date: Jan. 21, 2021

(65) Prior Publication Data
US 2022/0360411 A1  Nov. 10, 2022

(30) Foreign Application Priority Data
Jul. 12, 2019  (JP) .................. 2019-129873

(51) Int. Cl.
*H04L 5/00* (2006.01)
*H04B 7/024* (2017.01)
*H04L 1/1829* (2023.01)

(52) U.S. Cl.
CPC ........... *H04L 5/0055* (2013.01); *H04B 7/024* (2013.01); *H04L 1/1864* (2013.01)

(58) Field of Classification Search
CPC .................................................... H04L 5/0055
See application file for complete search history.

(56) References Cited

U.S. PATENT DOCUMENTS

| 2004/0218561 A1 | 11/2004 | Obuchi et al. |
| 2020/0021400 A1* | 1/2020 | Cherian ............... H04L 5/0055 |

(Continued)

FOREIGN PATENT DOCUMENTS

| EP | 1453338 A1 | 9/2004 |
| EP | 3968684 A1 | 3/2022 |

(Continued)

OTHER PUBLICATIONS

International Search Report and Written Opinion of PCT Application No. PCT/JP2020/025166, issued on Sep. 15, 2020, 09 pages of ISRWO.

(Continued)

*Primary Examiner* — Jason E Mattis
(74) *Attorney, Agent, or Firm* — CHIP LAW GROUP

(57) ABSTRACT

The present technology relates to communication control devices and methods, wireless communication devices and methods, and wireless communication terminals that can prevent retransmission of data that does not need to be retransmitted. A communication control device includes a communication unit that communicates with a first wireless communication device and a second wireless communication device; and a control unit that performs control to transmit response setting information in which a transmission method of a transmission result of coordinated transmission to a wireless communication terminal by the first wireless communication device and the second wireless communication device is set to the first wireless communi- (Continued)

cation device and the second wireless communication device. The present technology can be applied to communication systems.

19 Claims, 13 Drawing Sheets

(56) References Cited

U.S. PATENT DOCUMENTS

| | | |
|---|---|---|
| 2021/0281364 A1* | 9/2021 | Yeh .......................... H04L 1/20 |
| 2021/0385779 A1* | 12/2021 | Oteri ..................... H04W 8/005 |
| 2021/0399838 A1* | 12/2021 | Lou ........................ H04L 1/08 |
| 2022/0077964 A1* | 3/2022 | Wang ................... H04L 1/1812 |
| 2022/0209825 A1* | 6/2022 | Chitrakar .............. H04W 28/02 |
| 2022/0353018 A1 | 11/2022 | Sugaya |

FOREIGN PATENT DOCUMENTS

| | | |
|---|---|---|
| JP | 2015-119232 A | 6/2015 |
| TW | I665883 B | 7/2019 |
| WO | 2003/049484 A1 | 6/2003 |
| WO | WO-2014074919 A1 | 5/2014 |
| WO | WO-2020261988 A1 | 12/2020 |

OTHER PUBLICATIONS

Ryu, et al., "Consideration on multi-AP coordination for EHT", IEEE 802.11-18/1982r1, Jan. 2019, 10 pages.

\* cited by examiner

FIG. 4

| Signal Type | Length | Transmit Data ID | Transmit Scheme | Transmit Resource | Transmit Time | ACK Scheme |

FIG. 5

| Signal Type | Length | BlockAck Information |

FIG. 7

| Signal Type | Length | Request Data ID | Transmit Scheme | Transmit Resource | Transmit Time |
|---|---|---|---|---|---|

FIG. 8

| Signal Type | Length | Joint Tx Response Information |
|---|---|---|

FIG. 11

| Signal Type | Length | BlockAck Information | Buffer Information |

COMMUNICATION CONTROL DEVICE AND METHOD, WIRELESS COMMUNICATION DEVICE AND METHOD, AND WIRELESS COMMUNICATION TERMINAL

CROSS REFERENCE TO RELATED APPLICATIONS

This application is a U.S. National Phase of International Patent Application No. PCT/JP2020/025166 filed on Jun. 26, 2020, which claims priority benefit of Japanese Patent Application No. JP 2019-129873 filed in the Japan Patent Office on Jul. 12, 2019. Each of the above-referenced applications is hereby incorporated herein by reference in its entirety.

TECHNICAL FIELD

The present technology relates to communication control devices and methods, wireless communication devices and methods, and wireless communication terminals, and more particularly to communication control devices and methods, wireless communication devices and methods, and wireless communication terminals that can prevent retransmission of data that does not need to be retransmitted.

BACKGROUND ART

In recent years, access points (hereinafter referred to as APs) are increasingly being placed densely not only in public facilities such as stadiums but also in homes. For this reason, technologies that improve system throughput and reliability by coordination of APs are attracting attention.

For coordination of APs, there may be an AP (Master AP) that manages the APs. One of the AP-to-AP coordination technologies is Joint Transmission, in which data is simultaneously transmitted from a plurality of APs to one terminal (STA).

When AP1 and AP2 perform coordinated transmission according to an instruction from the Master AP, AP1 and AP2 coordinate to transmit data to STA. Then, the STA that has received the data transmits ACK, which is an acknowledgment of the data. In addition, PTL 1 describes a technique for controlling a modulation coding method on the basis of ACK.

CITATION LIST

Patent Literature

[PTL 1]
JP 2015-119232 A

SUMMARY

Technical Problem

The ACK transmitted from STA is received only by AP2. If AP1 fails to receive the ACK, the AP1 may attempt to retransmit the data even though the STA has successfully received the data and the ACK has been transmitted.

The present technology has been made in view of such a situation, and prevents retransmission of data that does not need to be retransmitted.

Solution to Problem

A communication control device according to a first aspect of the present technology includes: a communication unit that communicates with a first wireless communication device and a second wireless communication device; and a control unit that performs control to transmit response setting information in which a transmission method of a transmission result of coordinated transmission to a wireless communication terminal by the first wireless communication device and the second wireless communication device is set to the first wireless communication device and the second wireless communication device.

A wireless communication device according to a second aspect of the present technology includes: a communication unit that communicates with a communication control device and another wireless communication device; and a control unit that performs control to receive a coordinated transmission start signal for controlling the communication control device to perform coordinated transmission, control to cause the wireless communication terminal to perform the coordinated transmission with the other wireless communication device on the basis of the coordinated transmission start signal, and control to transmit a transmission result response signal including information regarding a receipt confirmation signal of the wireless communication terminal for the coordinated transmission to the communication control device.

A wireless communication terminal according to a third aspect of the present technology includes: a communication unit that communicates with a first wireless communication device and a second wireless communication device; and a control unit that performs control to determine a receipt result for data coordinately transmitted from the first wireless communication device and the second wireless communication device and control to transmit control information for transmitting a transmission result response signal including information on the receipt confirmation signal together with a receipt confirmation signal indicating the reception result to the communication control device to the first wireless communication device and the second wireless communication device.

In the first aspect of the present technology, the first wireless communication device and the second wireless communication device are communicated, and control is performed to transmit response setting information in which a transmission method of a transmission result of coordinated transmission to a wireless communication terminal by the first wireless communication device and the second wireless communication device is set to the first wireless communication device and the second wireless communication device.

In the second aspect of the present technology, the communication control device and the other wireless communication device are communicated; and control is performed to receive a coordinated transmission start signal for controlling the communication control device to perform coordinated transmission, control is performed to cause the wireless communication terminal to perform the coordinated transmission with the other wireless communication device on the basis of the coordinated transmission start signal, and control is performed to transmit a transmission result response signal including information regarding a receipt confirmation signal of the wireless communication terminal for the coordinated transmission to the communication control device.

In the third aspect of the present technology, a first wireless communication device and a second wireless communication device are communicated; and control is performed to determine a receipt result for data coordinately transmitted from the first wireless communication device and the second wireless communication device and control is performed to transmit control information for transmitting a transmission result response signal including information on the receipt confirmation signal together with a receipt confirmation signal indicating the reception result to the communication control device to the first wireless communication device and the second wireless communication device.

BRIEF DESCRIPTION OF DRAWINGS

FIG. 4 is a diagram showing a format example of a Joint Tx Trigger frame.

FIG. 5 is a diagram showing a format example of a Joint Tx Response frame.

FIG. 7 is a diagram showing a format example of a Joint Tx Response Request frame.

FIG. 8 is a diagram showing a format example of a Joint Tx End frame.

FIG. 11 is a diagram showing a format example of a Joint Tx Response frame in the case of a second embodiment.

DESCRIPTION OF EMBODIMENTS

Hereinafter, embodiments of the present technology will be described. Note that the description will be given in the following order.

0. Configuration Example of System and Device
1. First Embodiment (Example of Transmission of Information Regarding Block Ack)
2. Second Embodiment (Example in Which Buffer Amount is Also Transmitted)
3. Third Embodiment (Example of Induction of Transmission by STA)
4. Fourth Embodiment (Computer)

<0. Configuration Example of System and Device>
<Configuration Example of Communication System>

Figure 1:
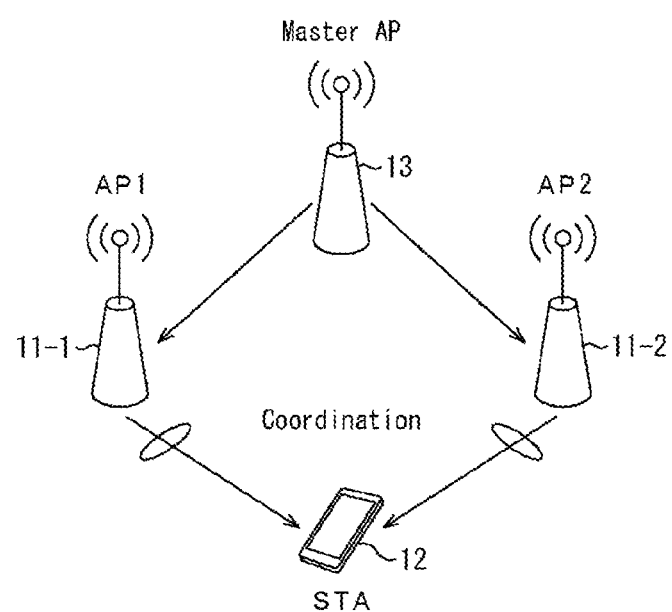
FIG. 1 is a diagram showing a configuration example of a communication system of the present technology.

FIG. 1 is a diagram showing a configuration example of a communication system according to an embodiment of the present technology.

The communication system of FIG. 1 is configured by connecting access points (hereinafter referred to as APs) 1 and AP2 and a Master AP by wired communication or wireless communication. The communication system is configured by connecting AP1 and AP2 and STA, which is a wireless communication terminal, by wireless communication.

AP1 and AP2 are configured of wireless communication devices 11-1 and 11-2 that coordinate to transmit data to the STA. The STA is configured of a wireless communication terminal 12 belonging to a network managed by the APs. The Master AP is configured of a communication control device 13 that controls communication of a plurality of APs. The wireless communication devices 11-1 and 11-2 are referred to as a wireless communication device 11 unless it is necessary to distinguish them.

The number and positional relationship of the wireless communication devices in FIG. 1 are examples, and are not limited to the description in FIG. 1.

<Configuration Example of Wireless Communication Device>

Figure 2:
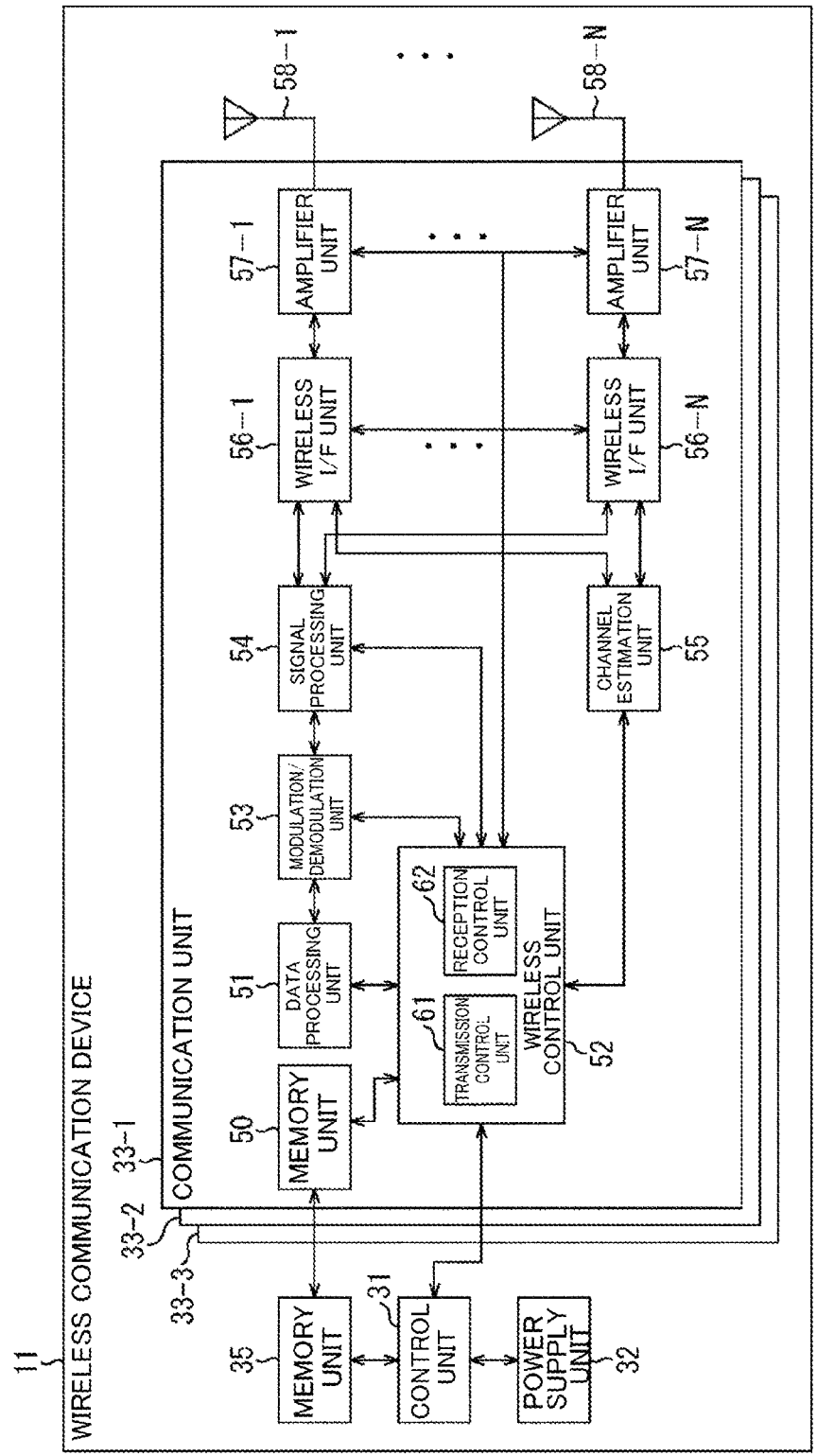
FIG. 2 is a block diagram showing a configuration example of a wireless communication device.

FIG. 2 is a block diagram showing a configuration example of a wireless communication device.

The wireless communication device 11 shown in FIG. 2 is a device that operates as an AP.

The wireless communication device 11 includes a control unit 31, a power supply unit 32, a communication unit 33, and a memory unit 35. Two or more communication units 33 may be provided. The control unit 31 and the communication unit 33 may be configured as one or more LSIs.

The communication unit 33 transmits and receives data. The communication unit 33 includes a memory unit 50, a data processing unit 51, a wireless control unit 52, a modulation/demodulation unit 53, a signal processing unit 54, a channel estimation unit 55, a wireless interface (I/F) unit 56-1 to 56-N, amplifier units 57-1 to 57-N. The communication unit 33 may be an independent component, or a part of the components of the communication unit 33 may be a common component. For example, the memory unit 50, the data processing unit 51, the wireless control unit 52, and the modulation/demodulation unit 53 may be shared.

For the wireless I/F units 56-1 to 56-N, the amplifier units 57-1 to 57-N, and the antennas 58-1 to 58-N, those having the same branch number may form a set, and each set may be configured as one component. The functions of the amplifier units 57-1 to 57-N may be included in the wireless I/F units 56-1 to 56-N, respectively.

Hereinafter, the communication units 33-1 to 33-3 are referred to simply as a communication unit 33 when it is not necessary to distinguish them. The wireless I/F units 56-1 to 56-N, the amplifier units 57-1 to 57-N, and the antennas 58-1 to 58-N are referred to simply as a wireless I/F unit 56, an amplifier unit 57, and an antenna 58 as appropriate when it is not necessary to distinguish them.

The control unit 31 is configured of a CPU (Central Processing Unit), a ROM (Read Only Memory), a RAM (Random Access Memory), and the like. The control unit 31 executes a program stored in the ROM, or the like, and controls the power supply unit 32 and the wireless control unit 52 of each communication unit 33.

The power supply unit 32 is configured of a battery or a fixed power supply, and supplies electric power to the entire wireless communication device 11.

The memory unit 50 holds the data input from an upper layer and outputs the data to the data processing unit 51. The memory unit 50 holds the data supplied from the data processing unit 51 and outputs the data to the upper layer. A part of the memory unit 50 is arranged as the memory unit 35 in the wireless communication device 11 outside the communication unit 33.

During transmission, the data processing unit 51 generates a packet for wireless transmission using the data supplied from the memory unit 50. The data processing unit 51 performs processing such as adding a header for media access control (MAC) and adding an error detection code to the generated packet, and outputs the processed data to the modulation/demodulation unit 53.

During reception, the data processing unit 51 performs MAC header analysis, packet error detection, reorder processing, and the like on the data supplied from the modulation/demodulation unit 53, and outputs the processed data to the memory unit 50.

The wireless control unit 52 transfers information between respective units of the wireless communication device 11 and controls each unit in the communication unit 33. The wireless control unit 52 includes a transmission control unit 61 and a reception control unit 62.

During transmission, the transmission control unit 61 sets parameters of the modulation/demodulation unit 53 and the signal processing unit 54, schedules packets in the data processing unit 51, sets parameters of the wireless I/F unit 56 and the amplifier unit 57, and controls transmission power as necessary. During reception, the reception control unit 62 sets parameters of the modulation/demodulation unit 53 and the signal processing unit 54 and sets parameters of the wireless I/F unit 56 and the amplifier unit 57 as necessary.

In particular, the transmission control unit 61 performs coordinated transmission of data with another AP on the basis of the coordinated transmission start signal indicating the start of coordinated transmission received from the Master AP. The coordinated transmission start signal includes response setting information in which the transmission method of the transmission result of the coordinated transmission is set.

The transmission control unit 61 determines the transmission result of the coordinated transmission on the basis of the receipt confirmation signal which is a Block Ack indicating the receipt of the data received from the STA. The transmission control unit 61 generates a transmission result response signal indicating the determined transmission result, including information on the receipt confirmation signal. The transmission control unit 61 controls each unit so as to transmit the transmission result response signal on the basis of the response setting information included in the coordinated transmission start signal.

The reception control unit 62 controls each unit so as to receive the coordinated transmission start signal transmitted from the Master AP. The reception control unit 62 controls each unit so as to receive the receipt confirmation signal transmitted from the STA. The reception control unit 62 controls each unit so as to receive the coordinated transmission end signal indicating the end of the coordinated transmission transmitted from the Master AP.

It should be noted that at least a part of the operations of the wireless control unit 52 may be performed by the control unit 31 instead of the wireless control unit 52. The control unit 31 and the wireless control unit 52 may be configured as one block.

During transmission, the modulation/demodulation unit 53 encodes, interleaves, and modulates the data supplied from the data processing unit 51 on the basis of the coding method and the modulation method set by the control unit 31 and generates a data symbol stream. The modulation/demodulation unit 53 outputs the generated data symbol stream to the signal processing unit 54.

During reception, the modulation/demodulation unit 53 outputs the data obtained as a result of demodulating, deinterleaving, and decoding the data symbol stream supplied from the signal processing unit 54 to the data processing unit 51 or the wireless control unit 52.

During transmission, the signal processing unit 54 performs signal processing for spatial separation on the data symbol stream supplied from the modulation/demodulation unit 53 as necessary, and outputs one or more transmission symbol streams obtained as a result of the signal processing to each wireless I/F unit 56.

During reception, the signal processing unit 54 performs signal processing on the reception symbol stream supplied from each wireless I/F unit 56, spatially separates the stream as necessary, and outputs a data symbol stream obtained as a result of the spatial separation to the modulation/demodulation unit 53.

The channel estimation unit 55 calculates complex channel gain information of a propagation path from a preamble portion and a training signal portion of the reception symbol stream supplied from each wireless I/F unit 56. The complex channel gain information is supplied to the modulation/demodulation unit 53 and the signal processing unit 54 via the wireless control unit 52, and is used for the demodulation processing in the modulation/demodulation unit 53 and the spatial separation processing in the signal processing unit 54.

During transmission, the wireless I/F unit 56 converts the transmission symbol stream from the signal processing unit 54 into an analog signal, performs filtering, up-conversion to a carrier frequency, and phase control, and outputs the analog signal after the phase control to the amplifier unit 57.

During reception, the wireless I/F unit 56 performs phase control, down-conversion, and reverse filtering on the analog signal supplied from the amplifier unit 57, and outputs a reception symbol stream obtained as a result of conversion to digital signals to the signal processing unit 54 and the channel estimation unit 55.

During transmission, the amplifier unit 57 amplifies the analog signal supplied from the wireless I/F unit 56 to a predetermined power, and outputs the power-amplified analog signal to the antenna 58. During reception, the amplifier unit 57 amplifies the analog signal supplied from the antenna 58 to a predetermined power, and outputs the power-amplified analog signal to the wireless I/F unit 56.

At least a part of at least one of a transmission function and a reception function of the amplifier unit 57 may be included in the wireless I/F unit 56. At least a part of at least one of the functions of the amplifier unit 57 may be a component outside the communication unit 33.

Since the configuration of the wireless communication terminal 12 that operates as the STA is basically the same as that of the wireless communication device 11, the configuration of the wireless communication device 11 will be used in the description of the wireless communication terminal 12.

In this case, the transmission control unit 61 performs control to transmit the data receipt confirmation signal to AP1 and AP2. The reception control unit 62 controls each unit so as to receive the data coordinately transmitted from AP1 and AP2.

Since the configuration of the communication control device 13 that operates as the Master AP is basically the same as that of the wireless communication device 11, the configuration of the wireless communication device 11 will be used in the description of the communication control device 13.

In this case, the transmission control unit 61 performs control to transmit the coordinated transmission start signal to AP1 and AP2. The transmission control unit 61 determines whether the coordinated transmission is completed on the basis of the transmission result response signals received from AP1 and AP2. When the coordinated transmission is completed, the transmission control unit 61 performs control to transmit the coordinated transmission end signal to AP1 and AP2. When the coordinated transmission is not completed, the transmission control unit 61 performs control to transmit the coordinated transmission start signal of the retransmission data of the coordinated transmission.

The reception control unit 62 performs control to receive the transmission result response signal transmitted from AP1 and AP2.

1. First Embodiment (Example of Transmission of Information Regarding Block Ack)

First, as a first embodiment, an example will be described in which each AP transmits a transmission result response signal including information on Block Ack to the Master AP.
<Example of Coordinated Transmission Sequence of Present Technology>

Figure 3:
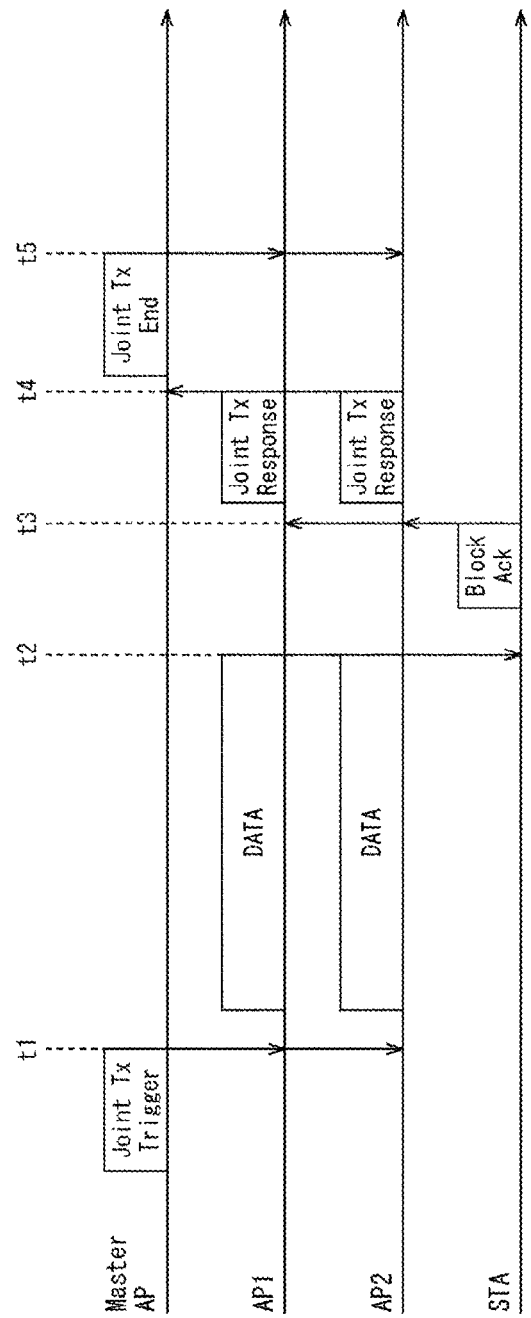
FIG. 3 is a diagram showing a sequence of coordinated transmission of the present technology.

FIG. 3 is a diagram showing a sequence for explaining a series of operations of coordinated transmission of the present technology.

It should be noted that Master AP, AP1, AP2, and STA may mutually confirm in advance whether they correspond to the operation of the present technology.

At time t1, the Master AP transmits a Joint Tx Trigger frame to AP1 and AP2. The Joint Tx Trigger frame is a coordinated transmission start signal. In the present technology, ACK Scheme information is described in the Joint Tx Trigger frame. The ACK Scheme information is response setting information for coordinated transmission.

At time t2, AP1 and AP2 coordinately transmit data to the STA on the basis of the information described in the Joint Tx Trigger frame. At this time, as the data transmitted by AP1 and AP2, the same data may be transmitted as shown in FIG. 3, or different data may be transmitted.

Upon receiving the data from AP1 and AP2, the STA transmits a Block Ack, which is a data receipt confirmation signal, to AP1 and AP2 at time t3.

AP1 and AP2 that has received the Block Ack from the STA within a predetermined time transmit the Joint Tx Response frame, which is the transmission result response signal, to the Master AP on the basis of the ACK Scheme information of the Joint Tx Trigger frame at time t4. The Joint Tx Response frame contains information on Block Ack and shows the transmission result determined on the basis of Block Ack. The predetermined time is, for example, ACK-timeout.

When the Master AP that has received the Joint Tx Response frame from AP1 and AP2 determines that data retransmission is not necessary on the basis of the Joint Tx Response frame, the Master AP transmits the Joint Tx End frame, which is the coordinated transmission end signal, to AP1 and AP2 at time t5. After the Joint Tx End frame is transmitted, the sequence of the coordinated transmission shown in FIG. 3 ends.
<Format Example of Joint Tx Trigger Frame>

FIG. 4 is a diagram showing a format example of the Joint Tx Trigger frame.

In FIG. 4, the Joint Tx Trigger frame includes the fields of Signal Type, Length, Transmit Data ID, Transmit Scheme, Transmit Resource, Transmit Time, and ACK Scheme.

The Signal Type field contains information indicating that this frame is a frame (coordinated transmission start signal) related to a request for coordinated transmission.

The Length field contains information on the length of this frame.

The Transmit Data ID field contains information that identifies the target data of the coordinated transmission request.

The Transmit Scheme field contains information on a communication method used to transmit the target data of the coordinated transmission request.

The Transmit Resource field contains information on a communication resource used for transmitting the target data of the coordinated transmission request.

The Transmit Time field contains information on the transmission timing of the target data of the coordinated transmission request.

The ACK Scheme field contains ACK Scheme information. As described above, the ACK Scheme information is the response setting information in which the transmission method of the information regarding the transmission result of the coordinated transmission is set between the Master AP, AP1 and AP2.

The ACK Scheme information is information that specifies the timing for transmitting the Joint Tx Response frame, which is a transmission result response signal, to the Master AP after receiving the Block Ack from the STA, for example. As the timing, it is possible to specify whether to transmit the Joint Tx Response frame immediately (Immediate Blok) or to transmit the same after receiving the Joint Tx Response Request frame requesting the Joint Tx Response frame.

The ACK Scheme information is information on whether to transmit the Joint Tx Response frames at the same time or in a time division manner.

The ACK Scheme information is information on communication resources used by each AP when transmitting the frames at the same time and information on transmission timing of each AP when transmitting the frames in a time division manner.

When it is instructed to transmit the Joint Tx Response frame after receiving the Joint Tx Response Request frame transmitted from the Master AP, the information such as the communication resource for transmitting the Joint Tx Response frame is described in the Joint Tx Response Request frame from the Master AP.
<Format Example of Joint Tx Response Frame>

Figure 5:
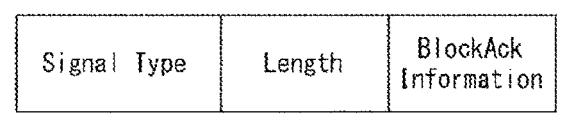

FIG. 5 is a diagram showing a format example of the Joint Tx Response frame.

In FIG. 5, the Joint Tx Response frame includes the fields of Signal Type, Length, and BlockACK Information.

The Signal Type field contains information indicating that this frame is a frame (transmission result response signal) containing information on Block Ack from the STA.

The Length field contains information on the length of this frame.

The BlockACK Information field contains information on the Block Ack of the coordinately transmitted data. If the Block Ack from the STA could not be received, the information indicating that the Block Ack could not be received is described.

In the sequence of FIGS. 3, AP1 and AP2 immediately transmit a Joint Tx Response frame to the Master AP after receiving the Block Ack. The sequence of FIG. 3 shows a case in which the information instructing to immediately transmit the Joint Tx Response frame using different communication resources for AP1 and AP2 at the same time after receiving the Block Ack from the STA is described in the ACK Scheme information described in the Joint Trigger of FIG. 4.
<Another Example of Coordinated Transmission Sequence of Present Technology>

Figure 6:
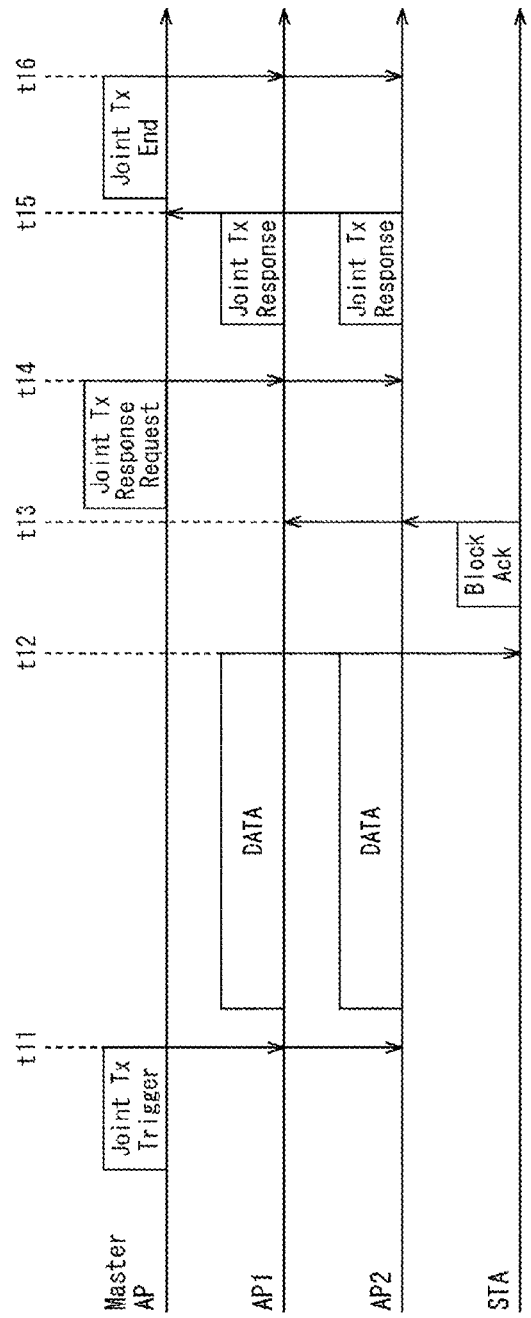
FIG. 6 is a diagram showing another sequence of coordinated transmission of the present technology.

FIG. 6 is a diagram showing another sequence of coordinated transmission of the present technology.

FIG. 6 shows a sequence when the information instructing to transmit the Joint Tx Response after receiving a frame requesting the Joint Tx Response from the Master AP after receiving the Block Ack from the STA is described in the ACK Scheme information described in the Joint Trigger of FIG. 4.

At time t11, the Master AP transmits a Joint Tx Trigger frame to AP1 and AP2.

At time t12, AP1 and AP2 coordinately transmit data to the STA on the basis of the information described in the Joint Tx Trigger frame.

Upon receiving the data from AP1 and AP2, the STA transmits a Block Ack to AP1 and AP2 at time t13.

At time t14, the Master AP transmits a Joint Tx Response Request frame to AP1 and AP2. The Joint Tx Response Request frame is a frame in which the Master AP requests a Joint Tx Response frame containing information on Block Ack.

Upon receiving the Joint Tx Response Request frame, AP1 and AP2 transmit the Joint Tx Response frame to the Master AP at time t15 on the basis of the ACK Scheme information described in the Joint Tx Trigger frame.

Upon receiving the Joint Tx Response frame from AP1 and AP2, the Master AP transmits the Joint Tx End frame to AP1 and AP2 at time t16 when it determines that data retransmission is not necessary on the basis of the Joint Tx Response frame. After the Joint Tx End frame is transmitted, the sequence of the coordinated transmission shown in FIG. 6 ends.

If the Joint Tx Response could not be received from either AP1 or AP2, the Master AP may transmit a Joint Tx Response Request to request AP1 and AP2 to retransmit the Joint Tx Response. At that time, a transmission method and a communication resource different from those during previous transmission of Joint Tx Response may be specified.

<Format Example of Joint Tx Response Request Frame>

FIG. 7 is a diagram showing a format example of the Joint Tx Response Request frame.

In FIG. 7, the Joint Tx Response Request frame includes the fields of Signal Type, Length, Request Data ID, Transmit Scheme, Transmit Resource, and Transmit Time.

The Signal Type field contains information indicating that this frame is a frame (transmission result request signal) that requests transmission of the Joint Tx Response frame from the STA.

The Length field contains information on the length of this frame.

The Request Data ID field contains information that identifies the target Ack of the transmission request.

The Transmit Scheme field contains information on the communication method used for transmitting the target Response of the transmission request.

The Transmit Resource field contains information on the communication resource used for transmitting the target Response of the transmission request.

The Transmit Time field contains information on the transmission timing of the target Response of the transmit request.

<Format Example of Joint Tx End Frame>

FIG. 8 is a diagram showing a format example of the Joint Tx End frame.

In FIG. 8, the Joint Tx End frame includes the fields of Signal Type, Length, and Joint Tx Response Information.

The Signal Type field contains information indicating that this frame is a frame (coordinated transmission end signal) for ending coordinated transmission.

The Length field contains information on the length of this frame.

In the Joint Tx Response Information field, information regarding the transmission result of the coordinated transmission determined by the Master AP is described. If it is determined by the Joint Tx Response frame received from AP1 and AP2 that all pieces of data have been successfully transmitted by coordinated transmission, the Joint Tx End frame with only Signal Type and Length may be transmitted without including Joint Tx Response Information.

By transmitting the Joint Tx End frame, as described above, even if AP1 fails to receive the Block Ack from the STA and only AP2 receives the Block Ack from the STA, AP1 will be notified of the transmission result of the coordinated transmission. Therefore, it is possible to prevent the AP1 from retransmitting the data by determining that the data needs to be retransmitted. The data remaining in the buffer of AP1 can be deleted for retransmission.

When the Master AP that has received the Joint Tx Response frame from AP1 and AP2 determines that the data needs to be retransmitted on the basis of the information on the Block Ack, the Joint Tx Trigger frame for retransmission is transmitted. At that time, in addition to the information of the Joint Tx End frame, the Joint Tx End+Trigger frame containing the information of the Joint Tx Trigger frame may be transmitted. When retransmitting all the data, the Joint Tx Trigger frame transmitted first and the Joint Tx Trigger frame for retransmission may be the same.

On the other hand, if it is determined that retransmission is not necessary, only the Joint Tx End is transmitted without transmitting the Joint Tx Trigger frame.

<Operation Example of Master AP>

Figure 9:
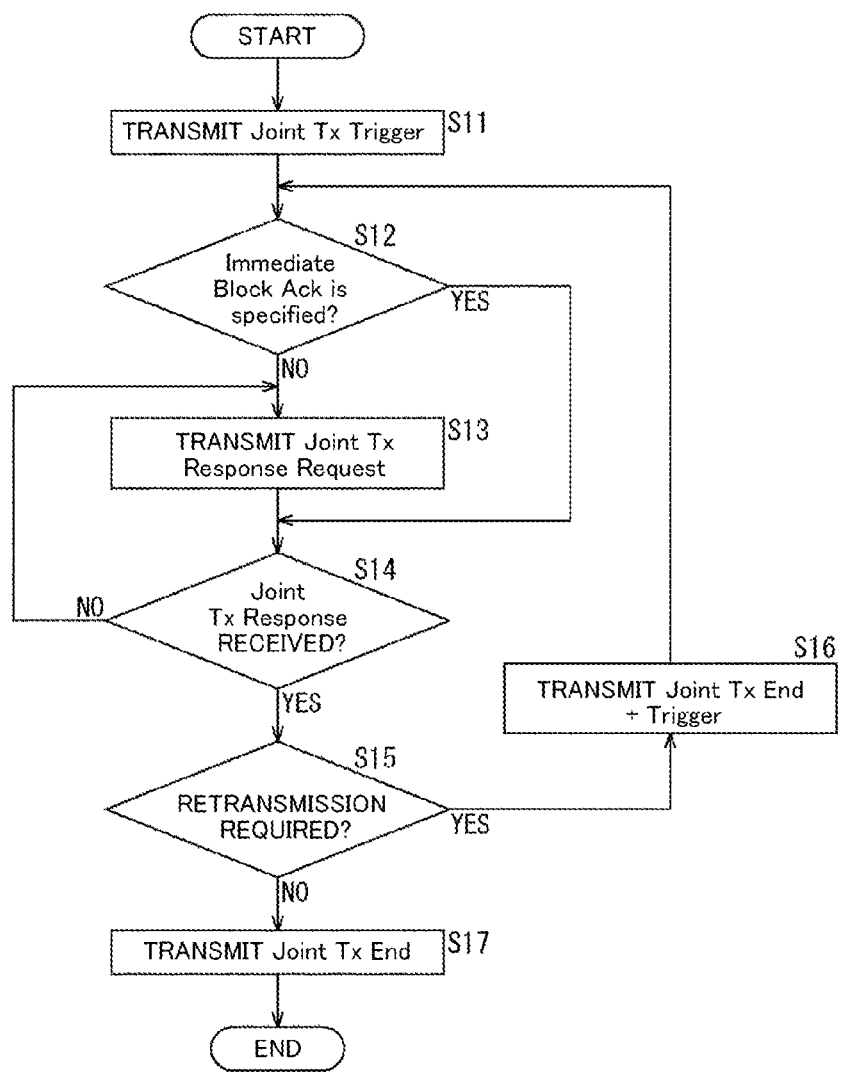
FIG. 9 is a flowchart illustrating a coordinated transmission process of a Master AP.

FIG. 9 is a flowchart illustrating the coordinated transmission process of the Master AP.

In step S11, the transmission control unit 61 controls each unit so as to transmit a Joint Tx Trigger frame.

In step S12, the transmission control unit 61 determines whether Immediate Block Ack is specified in the ACK Scheme information of Joint Tx Trigger. If it is determined in step S12 that Immediate Block Ack is not specified, the process proceeds to step S13.

In step S13, the transmission control unit 61 controls each unit so as to transmit the Joint Tx Response Request frame.

If it is determined in step S12 that Immediate Block Ack is specified, step S13 is skipped and the process proceeds to step S14.

The AP that has received the Joint Tx Response Request frame transmits the Joint Tx Response frame (step S55 in FIG. 10 described later).

In step S14, the reception control unit 62 determines whether the Joint Tx Response frame has been received. If it is determined in step S14 that the Joint Tx Response frame has not been received, the process returns to step S13, and the subsequent processing is repeated.

If it is determined in step S14 that the Joint Tx Response frame has been received, the process proceeds to step S15.

In step S15, the transmission control unit 61 determines whether retransmission is necessary. If it is determined in step S15 that retransmission is necessary, the process proceeds to step S16.

In step S16, the transmission control unit 61 transmits a frame including the Joint Tx End and the Joint Tx Trigger. In this case, the Joint Tx Trigger is a Trigger that initiates coordinated transmission for retransmission. After that, the process returns to step S12, and the subsequent processing is repeated.

If it is determined in step S15 that retransmission is not necessary, the transmission control unit 61 proceeds to step S17.

In step S17, the transmission control unit 61 transmits a Joint Tx End frame. After the Joint Tx End frame is transmitted, the coordinated transmission process of FIG. 9 ends.

<Operation Example of AP>

Figure 10:
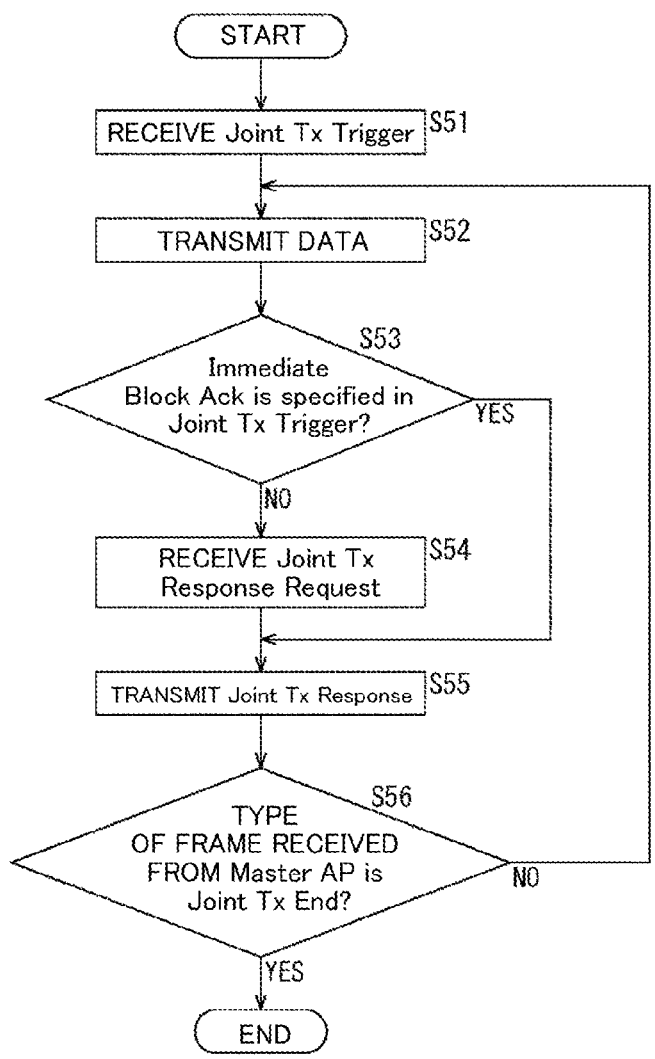
FIG. 10 is a flowchart illustrating a coordinated transmission process of APs.

FIG. 10 is a flowchart illustrating the coordinated transmission process of the AP.

The Master AP transmits a Joint Tx Trigger frame (step S11 in FIG. 9). In step S51, the reception control unit 62 controls each unit so as to receive the Joint Tx Trigger frame.

In step S52, the transmission control unit 61 controls each unit so as to transmit data in coordination with other APs on the basis of the Joint Tx Trigger.

In step S53, the reception control unit 62 determines whether Immediate Block Ack is specified in the ACK Scheme information of Joint Tx Trigger. If it is determined in step S53 that Immediate Block Ack is not specified, the process proceeds to step S54.

If Immediate Block Ack is not specified, the Master AP transmits a Joint Tx Response Request frame (step S13 in FIG. 9).

In step S54, the reception control unit 62 controls each unit so as to receive the Joint Tx Response Request frame transmitted by the Master AP. After receiving the Joint Tx Response Request frame, the process proceeds to step S55.

If it is determined in step S53 that Immediate Block Ack is specified, step S54 is skipped and the process proceeds to step S55.

In step S55, the transmission control unit 61 controls each unit so as to transmit the Joint Tx Response frame.

After that, the Master AP transmits a frame including the Joint Tx End frame (step S17 in FIG. 9) or the Joint Tx End and the Trigger (step S16 in FIG. 9) on the basis of the Joint Tx Response.

In step S56, the reception control unit 62 determines whether the type of the frame received from the Master AP is a Joint Tx End frame. If it is determined in step S56 that it is not a Joint Tx End frame, since there is retransmission data, the process returns to step S52, and the subsequent processing is repeated.

If it is determined in step S56 that it is a Joint Tx End frame, the coordinated transmission process of the AP of FIG. 10 ends.

As described above, in the first embodiment, when a plurality of APs coordinately transmits data under the control of the Master AP, it is possible to prevent data that does not need to be retransmitted from being retransmitted, for example, when only a certain AP could not receive the ACK from the STA.

2. Second Embodiment (Example in which Buffer Amount is Also Transmitted)

Next, as a second embodiment, an example will be described in which each AP transmits a transmission result response signal including information on its own buffer to the Master AP in addition to the information on Block Ack.

According to the instruction of the Master AP, the APs coordinately transmit data to the STA as shown in FIGS. 3 and 6, receive the Block Ack from the STA, and transmit the Joint Tx Response frame to the Master AP. In the second embodiment, when transmitting the Joint Tx Response frame to the Master AP, the AP also describes information on its own buffer and transmits the same.

<Format Example of Joint Tx Response Frame>

FIG. 11 is a diagram showing a format example of the Joint Tx Response frame in the case of the second embodiment.

In FIG. 11, the Joint Tx Response frame includes the fields of Signal Type, Length, BlockAck Information, and Buffer Information. The same part as the format example of FIG. 5 will be omitted.

The Buffer Information field contains information on the AP's buffer. The information on the buffer is, for example, buffer information indicating the data held in the buffer. The information on the buffer is specifically information on whether the data corresponding to the information in BlockAck Information still exists in its own buffer or has already been deleted.

The Master AP that has received the Joint Tx Response frame shown in FIG. 11 determines that it is necessary to retransmit the data on the basis of the information described in the BlockAck Information of AP1 and AP2. However, next, when it is determined from the Buffer Information that the data that needs to be retransmitted has already been deleted in AP1, for example, the Master AP generates Joint Tx Trigger for the retransmission data for AP2 in order to request AP2 to retransmit the data without requesting the AP1 to retransmit the data.

Although data does not need to be retransmitted, if data remains in the buffer of any AP, the Master AP may take the following actions. For example, the Master AP can describe only the information of the corresponding data in the Joint Tx Response Information of the Joint Tx End frame of FIG. 8 and delete the data from the buffer of each AP.

In the second embodiment described above, it is possible to prevent the Master AP from instructing each AP to retransmit data that could not be retransmitted, for example, when a packet is deleted in each AP due to reaching the retransmission upper limit.

3. Third Embodiment (Example of Induction of Transmission by STA)

Next, as a third embodiment, an example will be described in which the STA induces each AP to transmit a transmission result response signal to the Master AP.

<Example of Coordinated Transmission Sequence of Present Technology>

Figure 12:
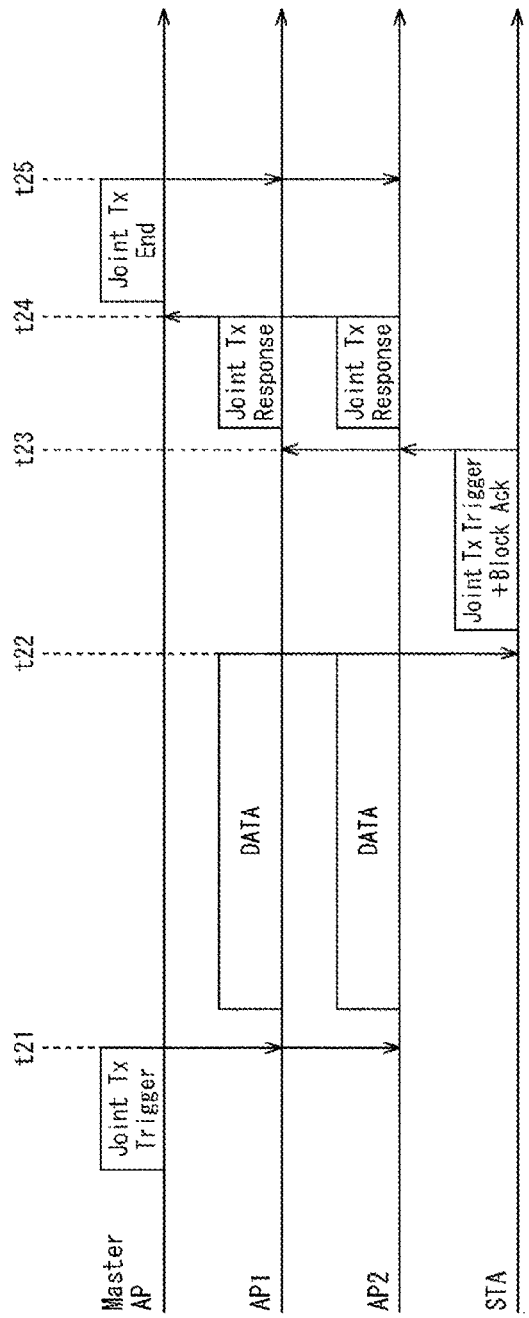
FIG. 12 is a diagram showing another sequence of coordinated transmission of the present technology.

FIG. 12 is a diagram showing another sequence of coordinated transmission of the present technology.

At time t21, the Master AP transmits a Joint Tx Trigger frame to AP1 and AP2, similar to the example in FIG. 3. At this time, in the ACK Scheme information, it is not necessary to describe the transmission method of Ack, and if it is described, it is described that it is specified by STA.

At time t22, AP1 and AP2 coordinately transmit data to the STA on the basis of the information contained in the Joint Tx Trigger frame.

Upon receiving the data from AP1 and AP2, the STA aggregates and transmits the Joint Tx Trigger in addition to the Block Ack, which is the response signal for confirming the receipt of the data, at time t23. As a result, the transmission of the Joint Tx Response frame, which is the transmission result response signal, is induced for each AP. At this time, the ACK Scheme information states that Ack is not transmitted (No Ack).

AP1 and AP2 transmit a Joint Tx Response frame to the Master AP at time t24 on the basis of the ACK Scheme information described in the Joint Tx Trigger frame transmitted from the STA.

When the Master AP that has received the Joint Tx Response frame from AP1 and AP2 determines that data retransmission is not necessary on the basis of the Joint Tx Response frame, the Master AP transmits the Joint Tx End frame indicating the end of coordinated transmission to AP1 and AP2 at time t25. After the Joint Tx End frame is transmitted, the sequence of the coordinated transmission shown in FIG. 12 ends.

At time t23 described above, either Block Ack or Joint Tx Trigger may be aggregated first and transmitted.

By transmitting Block Ack before Joint Tx Trigger, it is possible to immediately determine the content of Joint Tx Response that AP1 and AP2 should transmit. On the other hand, by transmitting the Joint Tx Trigger before the Block Ack, the surrounding communication terminals can immediately determine that the Joint Tx Response is transmitted from AP1 and AP2.

In the third embodiment described above, since the Joint Tx Trigger is transmitted together with the Block Ack, the reception status of the Block Ack in each AP can be immediately notified to the Master AP. Therefore, it is possible to prevent the data that does not need to be resent from being retransmitted.

As described above, in the present technology, the Master AP performs control to transmit the response setting information in which the transmission method of the transmission result of the coordinated transmission to the STA by AP1 and A2 is set to AP1 and AP2. Therefore, it is possible to prevent the data that does not need to be resent from being retransmitted.

4. Fourth Embodiment (Computer)

<Configuration Example of Computer>

The above-described series of processing can also be performed by hardware or software. When the series of processing is performed by software, a program for the software is embedded in dedicated hardware to be installed from a program recording medium to a computer or a general-purpose personal computer.

Figure 13:
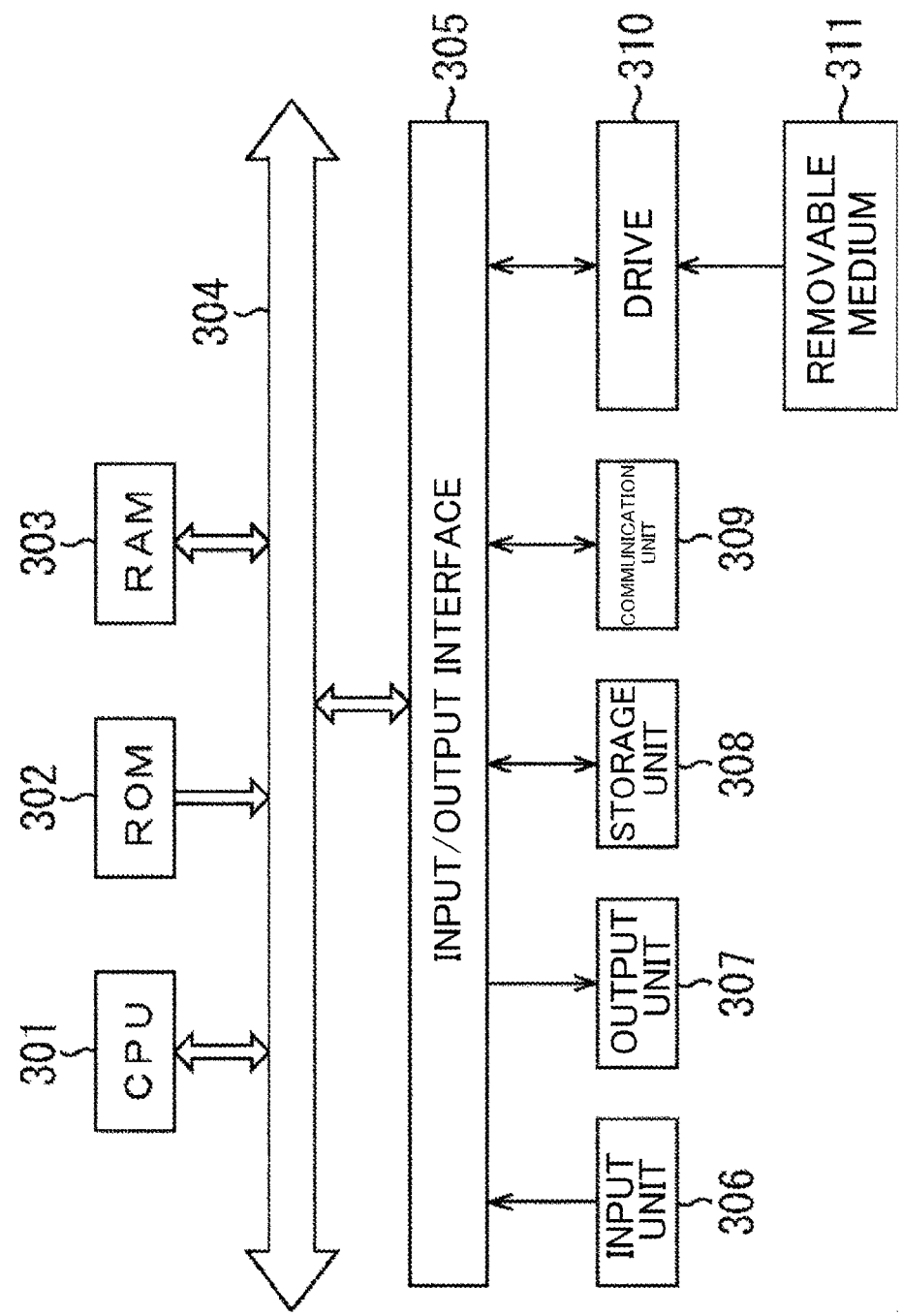
FIG. 13 is a block diagram showing a configuration example of a computer.

FIG. 13 is a block diagram illustrating an example of a hardware configuration of a computer that executes the series of processes described above according to a program.

A central processing unit (CPU) 301, a read only memory (ROM) 302, and a random access memory (RAM) 303 are connected to each other via a bus 304.

An input/output interface 305 is further connected to the bus 304. An input unit 306 including a keyboard and a mouse and an output unit 307 including a display and a speaker are connected to the input/output interface 305. A storage unit 308 including a hard disk or a nonvolatile memory, a communication unit 309 including a network interface, a drive 310 driving a removable medium 311 are connected to the input/output interface 305.

In the computer that has such a configuration, for example, the CPU 301 loads a program stored in the storage unit 308 to the RAM 303 via the input/output interface 305 and the bus 304 and executes the program to perform the above-described series of processing.

The program executed by the CPU 301 is recorded on, for example, the removable medium 311 or is provided via a wired or wireless transfer medium such as a local area network, the Internet, a digital broadcast to be installed in the storage unit 308.

The program executed by the computer may be a program that performs processes chronologically in the procedure described in the present specification or may be a program that performs a process at a necessary timing such as in parallel or upon being called.

In the present specification, a system is a collection of a plurality of constituent elements (devices, modules (components), or the like) and all the constituent elements may be located or not located in the same casing. Therefore, a plurality of devices housed in separate housings and connected via a network, and one device in which a plurality of modules are housed in one housing are both systems.

The advantages described in the present specification are merely exemplary and not limited, and other advantages may be obtained.

The embodiment of the present technology is not limited to the above-described embodiments, and various modifications can be made without departing from the gist of the present technology.

For example, the present technology can be configured as cloud computing in which one function is shared and processed in common by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

Combination Examples of Configurations

The present technology can be configured as follows.

(1) A communication control device including: a communication unit that communicates with a first wireless communication device and a second wireless communication device; and a control unit that performs control to transmit response setting information in which a transmission method of a transmission result of coordinated transmission to a wireless communication terminal by the first wireless communication device and the second wireless communication device is set to the first wireless communication device and the second wireless communication device.

(2) The communication control device according to (1), wherein the control unit performs control to transmit a first coordinated transmission start signal for controlling the first wireless communication device and the second wireless communication device to perform the coordinated transmission to the wireless communication terminal, the coordinated transmission start signal including the response setting information.

(3) The communication control device according to (1) or (2), wherein the control unit performs control to receive a transmission result response signal indicating the transmission result of the coordinated transmission, the transmission result response signal including information on a receipt confirmation signal transmitted from the wireless communication terminal, the transmission result response signal being transmitted from the first wireless communication device and the second wireless communication device on the basis of the response setting information.

(4) The communication control device according to (3), wherein the control unit performs control to determine whether to transmit a second coordinated transmission start signal to the first wireless communication device and the second wireless communication device on the basis of the transmission result response signal.

(5) The communication control device according to (4), wherein the control unit performs control to transmit a coordinated transmission end signal indicating the end of the coordinated transmission when it is determined that the second coordinated transmission start signal is not to be transmitted on the basis of the transmission result response signal.

(6) The communication control device according to (4), wherein when it is determined that the second coordinated transmission start signal is to be transmitted on the basis of the transmission result response signal, the control unit performs control to generate and transmit the second coordinated transmission start signal so as to include a coordinated transmission end signal indicating the end of the coordinated transmission.

(7) The communication control device according to (4), wherein when it is determined that the second coordinated transmission start signal is to be transmitted on the basis of the transmission result response signal, the control unit performs control to transmit the second coordinated transmission start signal for performing control to retransmit the coordinated transmission.

(8) The communication control device according to any one of (3) to (7), wherein the control unit performs control to transmit the response setting information indicating a transmission method of the transmission result response signal.

(9) The communication control device according to (8), wherein when the transmission result response signal includes buffer information regarding data held in a buffer of the first wireless communication device or the second wireless communication device, the control unit performs control to generate a second coordinated transmission start signal including information indicating retransmission data to be transmitted again from the data held in the buffer on the basis of the transmission result response signal.

(10) The communication control device according to (3), wherein the control unit performs control to transmit a transmission result request signal for requesting the transmission result response signal and performs control to receive the transmission result response signal transmitted from the first wireless communication device and the second wireless communication device on the basis of the transmission result request signal.

(11) The communication control device according to (10), wherein the control unit performs control to transmit the transmission result request signal including at least one of information indicating that the transmission result response signal is requested, information indicating a transmission method of the transmission result response signal for the coordinated transmission, and radio resources used for the response.

(12) The communication control device according to any one of (3) to (11), wherein the control unit performs control to transmit the response setting information including radio resources used for the first wireless communication device and the second wireless communication device to transmit the transmission result response signal.

(13) A communication control method by a communication control device, the method including: allowing a communication unit to communicate with a first wireless communication device and a second wireless communication device; and performing control to transmit response setting information in which a transmission method of a transmission result of coordinated transmission to a wireless communication terminal by the first wireless communication device and the second wireless communication device is set to the first wireless communication device and the second wireless communication device.

(14) A wireless communication device including: a communication unit that communicates with a communication control device and another wireless communication device; and a control unit that performs control to receive a coordinated transmission start signal for controlling the communication control device to perform coordinated transmission, control to cause the wireless communication terminal to perform the coordinated transmission with the other wireless communication device on the basis of the coordinated transmission start signal, and control to transmit a transmission result response signal including information regarding a receipt confirmation signal of the wireless communication terminal for the coordinated transmission to the communication control device.

(15) The wireless communication device according to (14), wherein the control unit performs control to receive response setting information regarding a transmission method of the transmission result response signal from the communication device and performs control to transmit the transmission result response signal to the communication control device on the basis of the response setting information.

(16) The wireless communication device according to (14) or (15), wherein the control unit performs control to receive a transmission result request signal from the communication device and performs control to transmit the transmission result response signal to the communication control device on the basis of the transmission result request signal.

(17) The wireless communication device according to any one of (14) to (16), wherein when the receipt confirmation signal has not been received from the wireless communication terminal, the control unit performs control to transmit the transmission result response signal indicating the coordinated transmission has failed to the communication control device.

(18) The wireless communication device according to any one of (14) to (17), wherein the control unit performs control to transmit the transmission result response signal including buffer information regarding data held in a buffer.

(19) A wireless communication method including: allowing a wireless communication device to communicate with a communication control device and another wireless communication device; and performing control to receive a coordinated transmission start signal for controlling the communication control device to perform coordinated transmission, control to perform the coordinated transmission with the other wireless communication device to a wireless communication terminal on the basis of the coordinated transmission start signal, and control to transmit a transmission result response signal including information regarding a receipt confirmation signal of the wireless communication terminal for the coordinated transmission to the communication control device.

(20) A wireless communication terminal including: a communication unit that communicates with a first wireless communication device and a second wireless communication device; and a control unit that performs control to determine a receipt result for data coordinately transmitted from the first wireless communication device and the second wireless communication device and control to transmit control information for transmitting a transmission result response signal including information on the receipt confirmation signal together with a receipt confirmation signal indicating the reception result to the communication control device to the first wireless communication device and the second wireless communication device.

REFERENCE SIGNS LIST

11 Wireless communication device
12 Wireless communication terminal
13 Wireless control device
31 Control unit
32 Power supply unit
33 Communication unit
35 Memory unit
50 Memory unit
51 Data processing unit
52 Wireless control unit
53 Modulation/demodulation unit
54 Signal processing unit
55 Channel estimation unit
56-1 to 56-N Wireless I/F unit
57-1 to 57-N Amplifier unit
58-1 to 58-N Antenna

The invention claimed is:

1. A communication control device, comprising:
a communication unit configured to communicate with a first wireless communication device and a second wireless communication device; and
a control unit configured to control transmission of response setting information to the first wireless communication device and the second wireless communication device, wherein
the response setting information is an ack scheme field information,
the response setting information indicates information related to a transmission method for transmission of a transmission result of a coordinated transmission,
the transmission result of the coordinated transmission is transmitted by the first wireless communication device and the second wireless communication device to the communication control device, and
the first wireless communication device and the second wireless communication device perform the coordinated transmission to a is set to the first wireless communication terminal.

2. The communication control device according to claim 1, wherein
the control unit is further configured to control transmission of a first coordinated transmission start signal to the first wireless communication device and the second wireless communication device,
the first coordinated transmission start signal controls the first wireless communication device and the second wireless communication device to perform the coordinated transmission to the wireless communication terminal, and
the first coordinated transmission start signal includes the response setting information.

3. The communication control device according to claim 2, wherein
the control unit is further configured to control reception of a transmission result response signal that indicates the transmission result of the coordinated transmission, the transmission result response signal includes information on a receipt confirmation signal transmitted from the wireless communication terminal, and
the transmission result response signal is transmitted from the first wireless communication device and the second wireless communication device based on the response setting information.

4. The communication control device according to claim 3, wherein
based on the transmission result response signal, the control unit is further configured to determine whether to transmit a second coordinated transmission start signal to the first wireless communication device and the second wireless communication device.

5. The communication control device according to claim 4, wherein the control unit is further configured to:
determine, based on the transmission result response signal, that the second coordinated transmission start signal is not to be transmitted; and
control to transmission of a coordinated transmission end signal based on the determination that the second coordinated transmission start signal is not to be transmitted, wherein
the coordinated transmission end signal indicates end of the coordinated transmission.

6. The communication control device according to claim 4, wherein the control unit is further configured to:
determine, based on the transmission result response signal, that the second coordinated transmission start signal is to be transmitted; and
control generation and transmission of the second coordinated transmission start signal, wherein
the second coordinated transmission start signal includes a coordinated transmission end signal that indicates end of the coordinated transmission.

7. The communication control device according to claim 4, wherein the control unit is further configured to:
determine, based on the transmission result response signal, that the second coordinated transmission start signal is to be transmitted; and
control transmission of the second coordinated transmission start signal, wherein
the second coordinated transmission start signal controls retransmission of the coordinated transmission.

8. The communication control device according to claim 3, wherein
the control unit is further configured to control the transmission of the response setting information that indicates a transmission method of the transmission result response signal.

9. The communication control device according to claim 8, wherein
based on the transmission result response signal that includes buffer information regarding data held in a buffer of the first wireless communication device or a buffer of the second wireless communication device, the control unit is further configured to control generation of a second coordinated transmission start signal, and
the second coordinated transmission start signal includes information that indicates retransmission data to be transmitted again from the data held in the buffer of the first wireless communication device or the buffer of the second wireless communication device.

10. The communication control device according to claim 3, wherein the control unit is further configured to:

control transmission of a transmission result request signal, wherein the transmission result request signal requests the transmission result response signal; and control the reception of the transmission result response signal transmitted from the first wireless communication device and the second wireless communication device based on the transmission result request signal.

11. The communication control device according to claim 10, wherein
the control unit is further configured to control the transmission of the transmission result request signal that includes at least one of information that indicates that the transmission result response signal is requested, information that indicates a transmission method of the transmission result response signal for the coordinated transmission, and radio resources used for transmission of the transmission result response signal.

12. The communication control device according to claim 3, wherein
the control unit is further configured to control the transmission of the response setting information that includes radio resources used by the first wireless communication device and the second wireless communication device to transmit the transmission result response signal.

13. A communication control method by a communication control device, the method comprising:
allowing a communication unit to communicate with a first wireless communication device and a second wireless communication device; and
controlling transmission of response setting information to the first wireless communication device and the second wireless communication device, wherein
the response setting information is an ack scheme field information,
the response setting information indicates information related to a transmission method for transmission of a transmission result of a coordinated transmission,
the transmission result of the coordinated transmission is transmitted by the first wireless communication device and the second wireless communication device to the communication control device, and
the first wireless communication device and the second wireless communication device perform the coordinated transmission to a is set to the first wireless communication terminal.

14. A first wireless communication device, comprising:
a communication communicates configured to communicate with a communication control device and a second wireless communication device; and
a control unit configured to:
control reception of a coordinated transmission start signal to control the communication control device to perform a coordinated transmission;
control reception of response setting information from the communication control device, wherein
the response setting information is an ack scheme field information, and
the response setting information indicates information related to a transmission method for transmission of a transmission result response signal;
control a wireless communication terminal to perform the coordinated transmission with the second wireless communication device based on the coordinated transmission start signal; and control the transmission of the transmission result response signal to the communication control device based on the response setting information, wherein
the transmission result response signal includes information regarding a receipt confirmation signal of the wireless communication terminal for the coordinated transmission.

15. The first wireless communication device according to claim 14, wherein
the control unit is further configured to:
control reception of a transmission result request signal from the communication control device; and
control the transmission of the transmission result response signal to the communication control device based on the transmission result request signal.

16. The first wireless communication device according to claim 14, wherein
in a case the receipt confirmation signal is not received from the wireless communication terminal, the control unit is further configured to control the transmission of the transmission result response signal to the communication control device, and
the transmission result response signal indicates that the coordinated transmission has failed.

17. The first wireless communication device according to claim 14, wherein
the control unit is further configured to control the transmission of the transmission result response signal that includes buffer information regarding data held in a buffer.

18. A wireless communication method, comprising:
allowing a first wireless communication device to communicate with a communication control device and a second wireless communication device;
controlling reception of a coordinated transmission start signal for controlling the communication control device to perform a coordinated transmission;
controlling reception of response setting information from the communication control device, wherein
the response setting information is an ack scheme field information, and
the response setting information indicates information related to a transmission method for transmission of a transmission result response signal;
controlling a wireless communication terminal to perform the coordinated transmission with the second wireless communication device based on the basis of the coordinated transmission start signal; and
controlling the transmission of the transmission result response signal to the communication control device based on the response setting information, wherein
the transmission result response signal includes information regarding a receipt confirmation signal of the wireless communication terminal for the coordinated transmission.

19. A wireless communication terminal, comprising:
a communication unit configured to communicate with a first wireless communication device and a second wireless communication device; and
a control unit configured to:
determine a reception result for data coordinately transmitted from the first wireless communication device and the second wireless communication device; and
control transmission of control information to the first wireless communication device and the second wireless communication device, wherein the control information is for transmission of a transmission result response signal to a communication control device, the transmission result response signal includes information on a receipt confirmation signal that indicates the reception result, the transmission result response signal is transmitted based on response setting information, the response setting information is an ack scheme field information, and the response setting information indicates information related to a transmission method for transmission of the reception result for the data coordinately transmitted from the first wireless communication device and the second wireless communication device.

\* \* \* \* \*